(12) United States Patent
Palazzo et al.

(10) Patent No.: US 9,820,613 B2
(45) Date of Patent: Nov. 21, 2017

(54) OIL HANDLING AND MONITORING DEVICE AND SYSTEM

(71) Applicant: FRONTLINE INTERNATIONAL, INC., Cuyahoga Falls, OH (US)

(72) Inventors: John W. Palazzo, Cuyahoga Falls, OH (US); Giovanni Brienza, Fairlawn, OH (US); Maxwell Lee Palazzo, Fort Wayne, IN (US); Ryan M. Mullen, Boston, MA (US)

(73) Assignee: Frontline International, Inc., Cuyahoga Falls, OH (US)

( * ) Notice: Subject to any disclaimer, the term of this patent is extended or adjusted under 35 U.S.C. 154(b) by 232 days.

(21) Appl. No.: 14/884,427

(22) Filed: Oct. 15, 2015

(65) Prior Publication Data

US 2016/0109887 A1 Apr. 21, 2016
US 2017/0295996 A9 Oct. 19, 2017

Related U.S. Application Data

(63) Continuation-in-part of application No. 13/987,771, filed on Aug. 30, 2013, now Pat. No. 9,512,383.

(60) Provisional application No. 62/065,308, filed on Oct. 17, 2014.

(51) Int. Cl.
*G05D 9/12* (2006.01)
*A47J 37/12* (2006.01)

(52) U.S. Cl.
CPC ....... *A47J 37/1285* (2013.01); *A47J 37/1266* (2013.01)

(58) Field of Classification Search
CPC ... A47J 37/1266; A47J 37/1285; C11B 13/00; B65B 3/30; A23D 9/06
USPC ..... 426/417; 222/61-63; 141/82, 94-96, 98, 141/198, 231; 137/395
See application file for complete search history.

(56) References Cited

U.S. PATENT DOCUMENTS

| | | | | |
|---|---|---|---|---|
| 4,485,831 A | * | 12/1984 | Ungerleider | A47J 37/1271 137/1 |
| 4,583,170 A | * | 4/1986 | Carlin | E21B 43/12 340/6.1 |
| 5,249,511 A | * | 10/1993 | Shumate | A47J 37/1223 137/358 |
| 5,586,486 A | * | 12/1996 | Nitschke | A47J 37/1228 99/330 |

(Continued)

*Primary Examiner* — Timothy L Maust
*Assistant Examiner* — Andrew Schmid
(74) *Attorney, Agent, or Firm* — McCarthy, Lebit, Crystal & Liffman, Co. LPA

(57) ABSTRACT

An architecture is presented that provides an oil monitoring device designed primarily to monitor, measure, and display measurement parameters for a containment tank of fresh or waste oil. The monitoring device can be positioned on the containment tank of fresh or waste oil, or can be positioned proximate to the containment tank, as long as the monitoring device remains in communication with the containment tank. The monitoring device comprises a real-time level sensor that is in communication with the containment tank of cooking oil. The level sensor measures usage and collection volumes, as well as filtration status of the containment tank in real-time and displays the information to a user via a display. Furthermore, the monitoring device comprises alarms to alert users of specific oil levels. The monitoring device can either be a stand-alone device or be linked to a computer program to function as a data management system.

7 Claims, 22 Drawing Sheets

(56) References Cited

U.S. PATENT DOCUMENTS

| | | | | |
|---|---|---|---|---|
| 5,597,601 | A * | 1/1997 | Griffin | A47J 37/1223 210/167.28 |
| 5,731,024 | A * | 3/1998 | Bivens | A47J 37/1223 210/167.28 |
| 5,776,530 | A * | 7/1998 | Davis | A47J 37/1266 426/233 |
| 5,964,258 | A * | 10/1999 | Schoenbauer | A47J 37/1223 141/231 |
| 6,981,531 | B1 * | 1/2006 | Palazzo | B08B 9/08 141/198 |
| 7,566,468 | B1 * | 7/2009 | Oberlin | C11B 3/008 426/330.6 |
| 8,123,458 | B2 | 2/2012 | Racer | F04D 9/02 415/122.1 |
| 8,148,668 | B2 * | 4/2012 | Bourg, Jr. | A47J 37/1214 219/385 |
| 8,419,897 | B2 * | 4/2013 | Bowles | C11B 13/005 162/16 |
| 8,627,762 | B2 * | 1/2014 | Gvili | A47J 37/1233 426/417 |
| 9,156,390 | B2 * | 10/2015 | Allora | A47J 37/1271 |
| 2003/0192621 | A1 * | 10/2003 | Allora | A47J 37/1223 141/98 |
| 2004/0020555 | A1 * | 2/2004 | Sus | B65B 43/305 141/82 |
| 2007/0227597 | A1 * | 10/2007 | Palazzo | A47J 37/1285 137/565.01 |
| 2008/0213445 | A1 * | 9/2008 | Feinberg | A47J 37/1223 426/417 |
| 2008/0213446 | A1 * | 9/2008 | Feinberg | A47J 37/1266 426/417 |
| 2008/0277412 | A1 * | 11/2008 | Palazzo | A47J 37/1223 222/63 |
| 2010/0116345 | A1 * | 5/2010 | Florkey | A47J 37/1223 137/1 |
| 2011/0186592 | A1 * | 8/2011 | Palazzo | A47J 37/0871 222/1 |
| 2013/0156910 | A1 * | 6/2013 | Clayson | B01D 29/15 426/417 |
| 2013/0183421 | A1 * | 7/2013 | Evraets | B01D 29/09 426/417 |
| 2014/0356499 | A1 * | 12/2014 | Palazzo | C11B 13/00 426/417 |
| 2015/0024100 | A1 * | 1/2015 | Bell | A47J 37/1223 426/417 |
| 2016/0109887 | A1 * | 4/2016 | Palazzo | A47J 37/1285 137/2 |

* cited by examiner

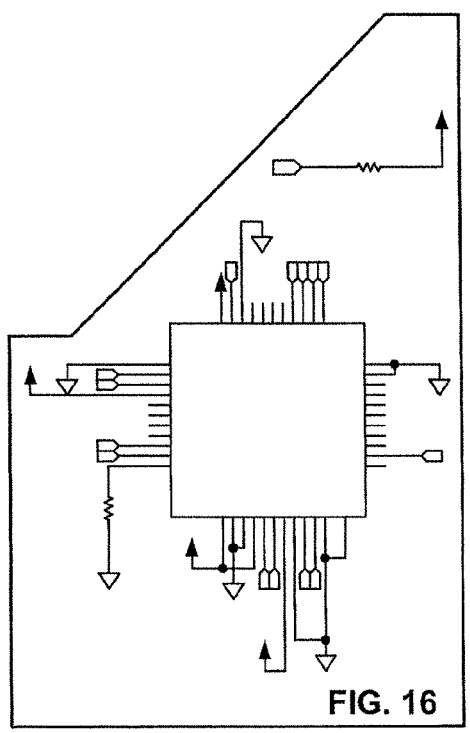
FIG. 16
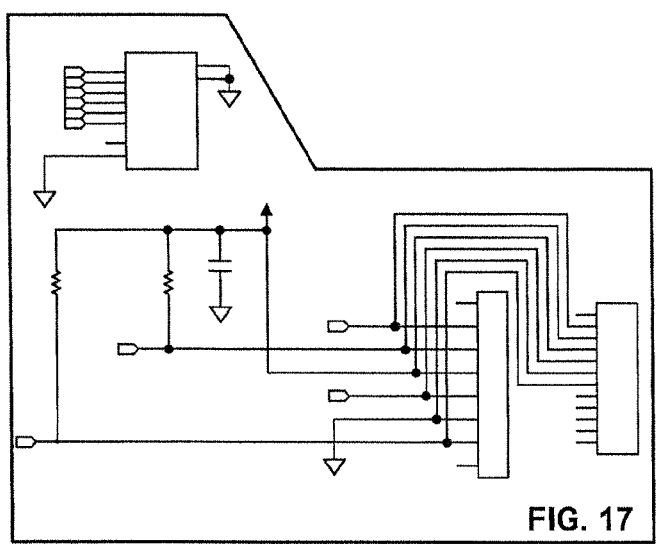
FIG. 17
FIG. 20

OIL HANDLING AND MONITORING DEVICE AND SYSTEM

FIELD OF INVENTION

The present invention is in the field of handling and management of waste cooking oil and fresh cooking oil.

BACKGROUND

Health and safety issues along with finding ways to reduce costs of labor and food are ongoing efforts for every restaurant across the world. One area that always has high safety and cost concerns in any restaurant that fries food is the handling, use and removal of cooking oil. Much has been done to automate the handling and use of waste cooking oil and fresh cooking oil, but there are few options available to automate, monitor, measure and manage a users' oil use, allowing a user to have greater control of their fry oil usage. Consequently, an effective solution is necessary.

There is a need for an automated data management system that monitors waste oil, oil filtration, and fresh oil, and that allows a user to track usage and collection volumes and compare relevant data. The present invention discloses an oil monitoring device or integrated control panel designed primarily to monitor, measure, and display measurement parameters for containers of fresh oil and/or waste oil and oil filtration, and also discloses that the monitoring device or integrated control panel can be linked to one or more computers, any one of which may function as a data management system. The monitoring device or integrated control panel may be linked to computer by hard wire, by wireless connection or cellular network, etc. The system allows a user to have greater control over fry oil usage, and allows the user to track the data online, any time, twenty four hours a day, seven days a week. The system also allows a variety of individuals to track the entire oil use process, for example, customers, their franchisees and waste oil recovery companies, and the like. Thus, the system provides management of fry oil usage, which helps to reduce oil use, lower costs, and increase profits.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an oil monitoring device or integrated control panel designed primarily to monitor, measure, and display measurement parameters for a container of fresh oil, a container of waste oil and filtration of oil in an oil usage system. The system comprises an oil system for dispensing fresh oil, a waste oil collection tank, and appropriate valving and plumbing connecting the fresh oil system, the fryer units, and the waste oil collection tank. The waste oil collection tank is fitted with appropriate exit plumbing and valving to allow the removal of the waste oil by the waste oil collection and recovery truck.

The monitoring device can be positioned on the container of oil, or can be positioned proximate to the container or remotely connected, as long as the monitoring device remains in communication with the container. The monitoring device comprises or is in communication with real-time level sensors that are in communication with the container of fresh and used cooking oil. The level sensors, by their measurement and analysis of real-time volume, reflect remaining fresh, usage and collection volumes, as well as filtration status in real-time and displays the information to a user via a display. Other information displayed may include: temperature in the collection tank, whether fill valve is open or closed, whether empty valve is open or closed etc.

Furthermore in the preferred embodiment of the present invention, the monitoring device comprises alarms and/or user alerts. For example, an alarm can be sounded when the fresh oil supply reaches a predetermined or pre-set certain level so that a user knows to re-fill the tank, or an alarm can be sounded when the waste oil tank reaches a 'full' level so that a user can empty the tank, or a waste oil collection and recovery company can be notified to come and empty the tank. Additionally, user alerts and/or alarms can also be sent if the monitoring device displays any diagnostic warnings. Diagnostic warnings include, but are not limited to the following: full tank, low tank, empty tank, open valve, internet failure, etc. The monitoring device can be a stand-alone device, or can be linked to one or more computers, any one of which may function as a data management system. All data may be displayed visually at the control panel or via user interface such as a computer linked by hard wire or wireless connection or cellular network.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The foregoing and still other objects and advantages of the present invention will be more apparent from the detailed explanation of the preferred embodiments of the invention in connection with the accompanying drawings, wherein:

FIGS. 9-20 are electrical schematics of the integrated control panel.

DETAILED DESCRIPTION OF THE INVENTION

Figure 1:
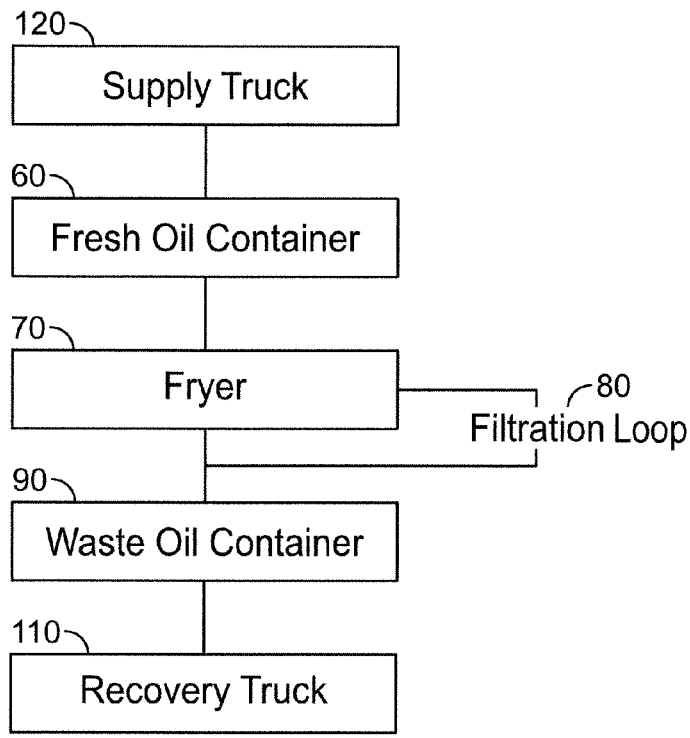
FIG. 1 is a flowchart comprising a schematic representation of the oil flow in the entire oil handling and monitoring system.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses an automated data management system in communication with an oil monitoring device or an integrated control panel that monitors the use of fresh oil, the collection of waste oil for recovery, and oil filtration, and that allows a user to track usage and collection volumes and to evaluate, over time, relevant use, filtration and collection statistics. The present invention discloses an oil monitoring device or integrated control panel designed primarily to monitor, measure, and display measurement parameters for a container of fresh oil and/or waste oil and filtration of the oil, and also discloses that the monitoring device can be linked to one or more computers to function as a data management system. The monitoring device can be positioned on the container of fresh oil or waste oil, or can be positioned proximate to either container or remotely connected, as long as the monitoring device remains in communication with the container, wherein this communication can be either hardwired or wireless. The monitoring device communicates with real-time level sensors, fresh oil fill pump, fryer fill switch, float switch, fill shut off valve, waste oil pumpout enable valve, and recover/filter pump as well as its corresponding valves that are also in communication with the appropriate container of cooking oil. Both the fresh oil container and waste oil container have level sensors, flow shutoff valves and pumps that communicate with the monitoring device. The waste oil level sensor measures usage and collection volumes, as well as filtration status of the container in real-time and displays the information to a user via a display. Level sensors may be any kind, including a single liquid level float. The level sensor that is most preferred is an ultrasonic level detector that is capable of withstanding the severe environment of hot used cooking oil and grease.

Thus, the system allows a user to have greater control over fry oil usage, and allows the user to track the accumulated data online, any time, twenty four hours a day, seven days a week. Thus, the system provides management of fry oil usage, which helps to reduce oil use, lower costs, and increase profits.

A user can then access his or her data and view any data reports on-line via a user interface. The data can be customized and prepared as charts, spreadsheets, graphs, etc., or any other suitable means for displaying data. A user can then print and download the data, reports, etc. to his or her computer system, smart phone, tablet or other electronic device. Charts and data for any past period of time may be stored on one or more than one server.

The user would position the integrated control panel on (or proximate to) a waste oil container and/or a fresh oil container and would position the level sensor in communication with the waste oil container and/or the fresh oil container. The integrated control panel would then monitor and measure the waste oil, oil filtration and fresh oil of the containers, and transient signals effecting those measurements to an appropriate user interface thus allowing the user to track usage and collection volumes and compare relevant data. For example, a user may analyze the data to evaluate whether the cooking oil is being filtered too frequently. A user may also track the information to evaluate whether the oil is being transferred to the waste oil collection tank too frequently (or too infrequently). The data would then be transferred to a web server and there on to a user interface where it is managed and monitored. Users can then access their data and view reports any time on-line.

Users would log into a web page by entering a username and password, for security purposes. Once logged-in, another web page will open where a user would see a list of all his or her stores and information on oil usage and collection for each store in spreadsheet form. For example, the second and third columns of the spreadsheet could show each store's fresh oil and waste oil system usage, broken down by the current date, the week to date, month to date, and year to date. The fourth column of the spreadsheet could show filtration status, and the last column could indicate how many gallons of waste oil have been collected, starting with the most recent collection and then current week to date and year to date. In this way, a user can track the value of the waste oil collected, and the amount of rebate to be expected from the waste oil collection company. A user would also have the option of setting their stores' filtering intervals and times according to their own needs. A user can then save and/or print the web page as a spreadsheet report or can simply print the web page as is by clicking on the links at the bottom of the web page.

Additionally, blocks of color in certain columns of the spreadsheet could be used to indicate alarms or up-to-the-minute status of the system. A user would refer to the color key at the top of the chart to interpret what the different colors would mean. Further, whenever a user would see one of the colors on a block of data, it would also mean that an email or text alarm will be sent to a designated person or persons (e.g., the district manager) so that the proper actions may be taken.

For a user to obtain additional details on any one store's specific usage, a user clicks on the store number link in the list of the spreadsheet, which will take the user to a web page displaying the store's specific sensor information and readings on the waste oil system, fresh oil system and filtration system. Additionally, in the Sensor Information section of the web page, there are buttons to allow remote opening or closing of the collection port valve. Further, the user's waste oil collection company would be given a username and password so that the collection company can open and close the valve as necessary. The valve can also be set to open at a pre-set time, saving the collection company time.

In the Waste Oil System and Fresh Oil System sections of the web page, a user can view customized data readings as charts or as spreadsheets. A user would simply enter a begin date and an end date for any time period for which the user would want to create a detailed report. A user would be able to retrieve data from anytime as far back as the date the user's system was installed. A user can also customize the way he or she wants to view their report. A user clicks on the 'Chart' button of the web page and obtains a graph plotting usage during that time period. A user then clicks on the 'Spreadsheet/Excel' button of the web page to view the same period in spreadsheet format. A user can also click on 'View Data' of the web page to see the numerical parameters used to create the chart. A user can then print or download the reports to his or her computer system, thus allowing a user to keep track of their oil usage from month to month or even compare yearly data for up to any number of years. Typically, charts for the last thirty days of waste oil and fresh oil readings are always available and can be printed or downloaded to a user's computer system. If a user rolls their mouse over a chart, the user will see the gallon reading at each point on the graph. A user then simply logs-out when they are finished, and can check reports again as often as they want to.

Referring initially to the drawings, FIG. 1 is a flowchart depicting the flow of oil through the entire system. As the oil travels through the system, data is measured, transferred to any computer and may then be analyzed for the user by the data transfer and analysis system shown in FIGS. 2-3.

Figure 2:
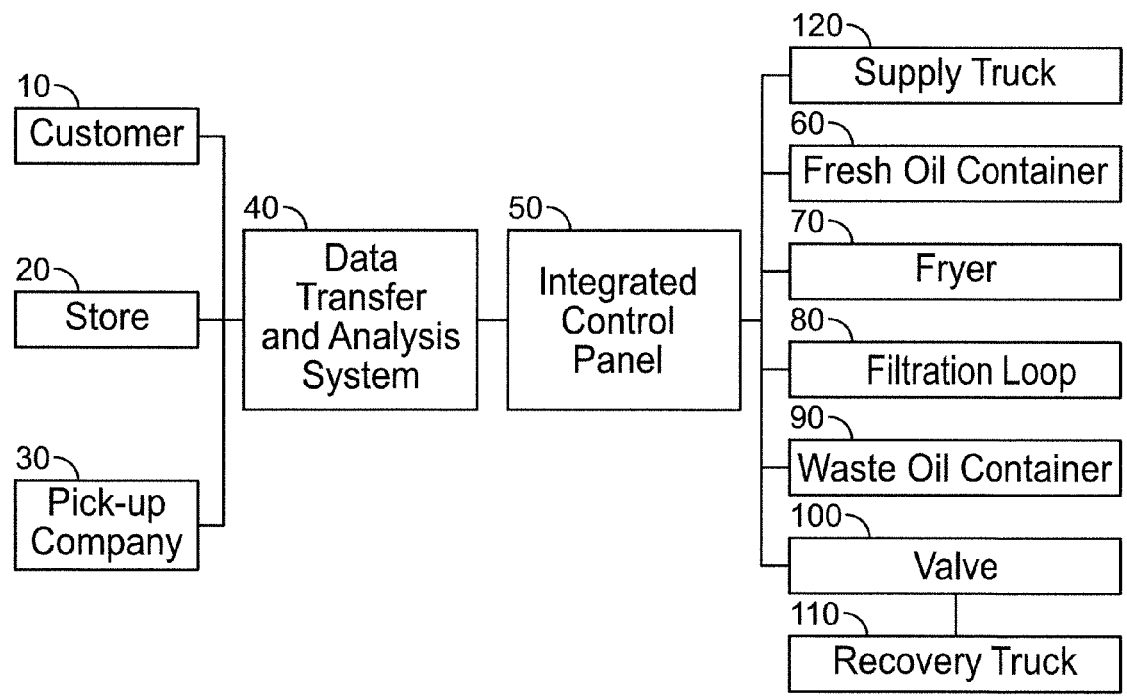
FIG. 2 is a flowchart comprising a schematic representation of the data transfer in the entire oil handling and monitoring system.

FIG. 2 illustrates the integrated web reporting data management system. The system comprises an integrated control panel 50 that is in communication with a waste oil container 90, and/or a fresh oil container 60. Real-time level sensors send signals reflective of volumes to the integrated control panel 50. The integrated control panel 50 then transfers the volume data to the data transfer and analysis system 40 through which it is accessible by a customer 10, a store 20, a waste oil pick-up company 30, or any other end authorized end user.

Figure 3:
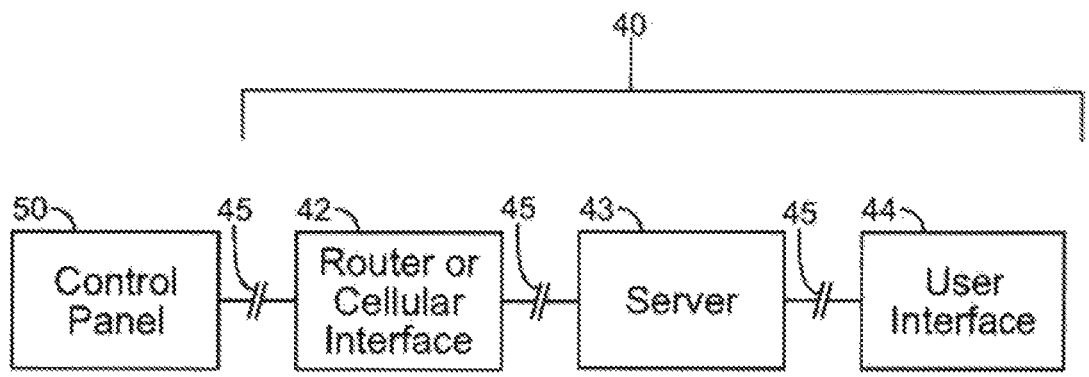
FIG. 3 is a flowchart comprising a schematic representation of a portion of the data transfer.

FIG. 3 illustrates the path the information travels through the data transfer and analysis system. The integrated control panel 50 is connected to a router or internet interface 42 via communication path 45 which is any suitable means known in the art (meaning hard-wired or wireless connection or cellular network), which is in communication with a server 43 via communication path 45 which is any suitable means as is known in the art. The server 43 can then be accessed by the authorized end user via the user interface 44. The integrated control panel 50 is then monitored and managed via server 43. The server 43 in communication with any computer or user interface device allows a user to monitor and measure their waste oil, oil filtration, and fresh oil, thus allowing a user to track usage and collection volumes and compare statistics daily, weekly, and/or monthly via standard data handling techniques. Automatic alarms and/or user alerts can be sent by email or text to users when specific events occur. For example, an alarm can be triggered when the fresh oil supply reaches a predetermined or preset certain level so that a user knows to re-fill the tank, or an alarm can be triggered when the waste oil tank reaches a predetermined or preset 'full' level so that a user can empty the tank, or an oil collection company can be automatically notified to come and empty the tank. Additionally, user alerts and/or alarms can also be sent if the monitoring device displays any diagnostic warnings. Further, when needed, diagnostic warnings are also sent simultaneously to any store manager or district manager, and also to Frontline® service technicians.

Furthermore, the server 43 (and/or its router or cellular interface 42 or user interface 44) can also control and allow for the remote opening or closing of the collection port valve 100, as shown in FIG. 2, such that users do not have to monitor who is opening or closing the port valve 100. Typically, a user's waste oil collection company would be given a username and password so they can open and close the valve as necessary. The port valve can also be set to open at a pre-set time, which can save the collection company time.

Figure 4:
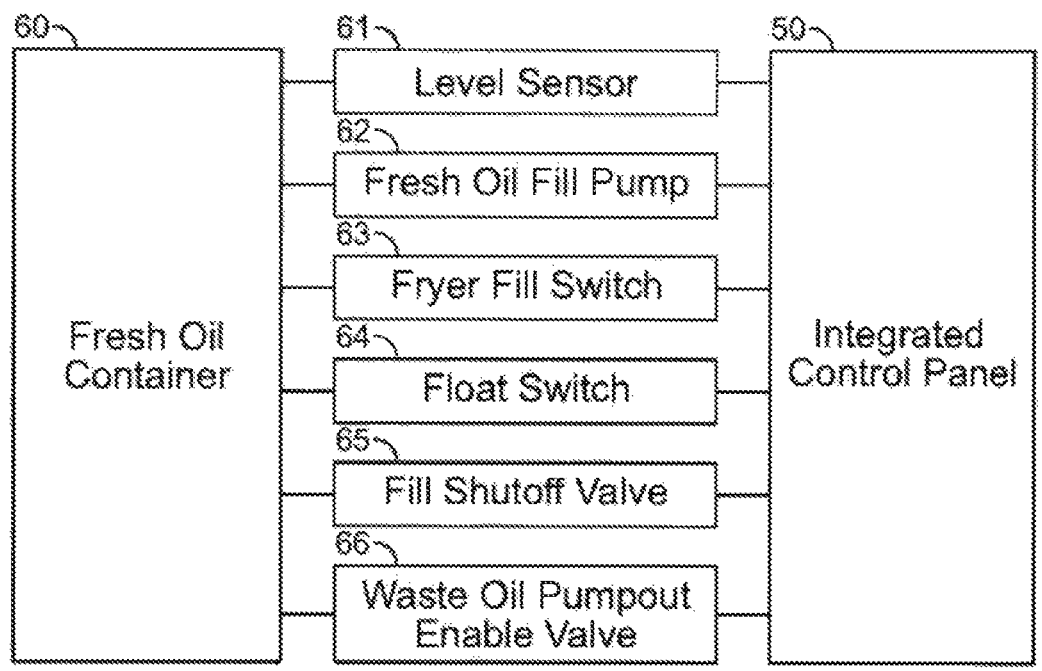
FIG. 4 is a flowchart comprising a schematic representation of the data transfer in the fresh oil portion of the system.

FIG. 4 illustrates the communication between the integrated control panel 50 and the fresh oil container 60. The fresh oil container 60 can be any container, including, without limitation, boxes, tins, bags, jugs, etc. as is known in the art without affecting the overall concept of the invention. The integrated control panel 50 can be positioned on the fresh oil container 60, or can be positioned proximate to the fresh oil container 60, or even positioned away from the fresh oil container 60 such as in a loading dock area, or can be positioned at any other suitable position as is known in the art as long as the integrated control panel 50 remains in communication with the fresh oil container 60, wherein this communication can be either hardwired or wireless. If positioned on the fresh oil container 60, the integrated control panel 50 can be welded to the container or secured via fasteners, such as screws, bolts, sealing rings, or any other means as is known in the art. Additionally, the fasteners would typically comprise a gasket to prevent leaks.

The integrated control panel 50 is typically powered via AC power, but could be powered via any other means as is known in the art, such as batteries, solar power, etc. The integrated control panel 50 in communication with the fresh oil container 60 comprises measurement controls and gauges that can be arranged in any configuration as is known in the art. The integrated control panel 50 communicates with a real-time level sensor 61, a fresh oil fill pump 62, a fryer fill switch 63, a float switch 64, a fill shutoff valve 65, a waste oil pumpout enable valve 66 or any other sensor that can measure any other suitable parameter of the fresh oil container 60 as is known in the art, such as diagnostic problems, valve openings/closings, etc. without affecting the overall concept of the invention as all of these sensors are in communication with the fresh oil container 60 as well. The level sensor 61, of conventional design and construction as is known in the art, would monitor the level of oil in the container. The fresh oil fill pump 62 would control the filter pump, pushing the filter pump button turns on the filter pump for a predetermined or preset amount of time. The float level switch 64 is optionally used to indicate that a container of fresh oil is empty and needs to be changed. The fill shutoff valve 65 closes an inlet valve once waste oil in the container reaches a certain level and opens the inlet valve when the waste oil has been removed from the container. The optional waste oil pump-out enable valve 66 opens the pump-out valve when the container is full and waste oil needs to be pumped out, and closes the pump-out valve when the container is empty and ready to be filled. That information can be read on the display panel 51 of the integrated control panel or when transferred via the data transfer and analysis system 40 it can be read on a computer, tablet, mobile phone or other user interface 44. Generally, the level sensor 61 is a typically constructed sensor as is known in the art, and can be a frequency sensor, a current sensor, an ultrasonic sensor, a thermostatic sensor, a mechanical sensor, etc., or any other suitable sensing means.

Figure 5:
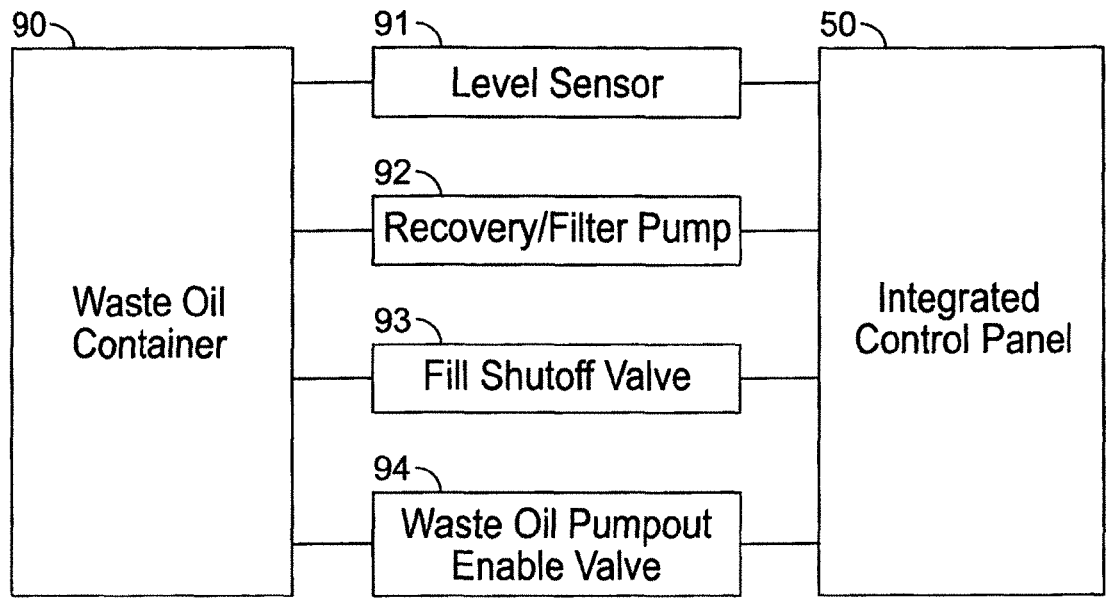
FIG. 5 is a flowchart comprising a schematic representation of the data transfer in the recovery and filtration portion of the system.

FIG. 5 illustrates the communication between the integrated control panel 50 and the waste oil container 90. The integrated control panel 50 in communication with the waste oil container 90 comprises measurement controls and gauges that can be arranged in any configuration as is known in the art. Specifically, the monitoring device comprises a level sensor 91, a filter pump control 92, a fill shutoff valve 93, and optionally a waste oil pump-out enable valve 94. The level sensor 91 would monitor the level of oil in the container. The filter pump 92 would control the filter pump, for example pushing the filter pump button turns on the filter pump for approximately fifteen (15) minutes. The fill shutoff valve 93 closes an inlet valve once waste oil in the container reaches a certain level and opens the inlet valve when the waste oil has been removed from the container. The optional waste oil pump-out enable valve 94 opens the pump-out valve when the container is full and waste oil needs to be pumped out, and closes the pump-out valve (and may be remotely controlled) when the container is empty and ready to be filled. Valve 94 also contains a valve position sensor that is in communication with the integrated control panel 50. Valve position sensor may be password protected for preventing unsecured access to the valve. The recovery and filtration system is previously described and disclosed in U.S. Pat. No. 6,981,531 to Palazzo.

Figure 22:
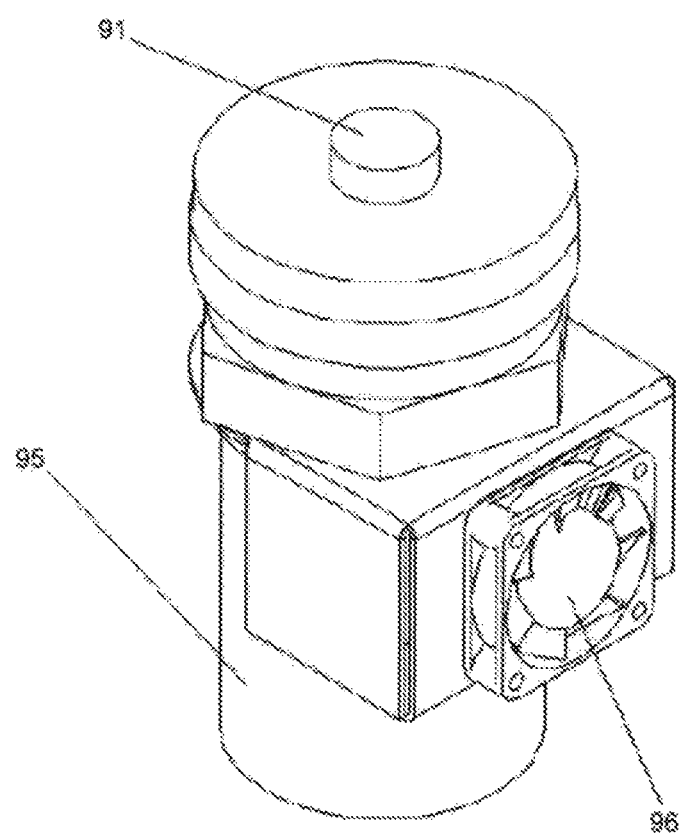
FIG. 22 is a perspective view of the level sensor component.
Figure 23:
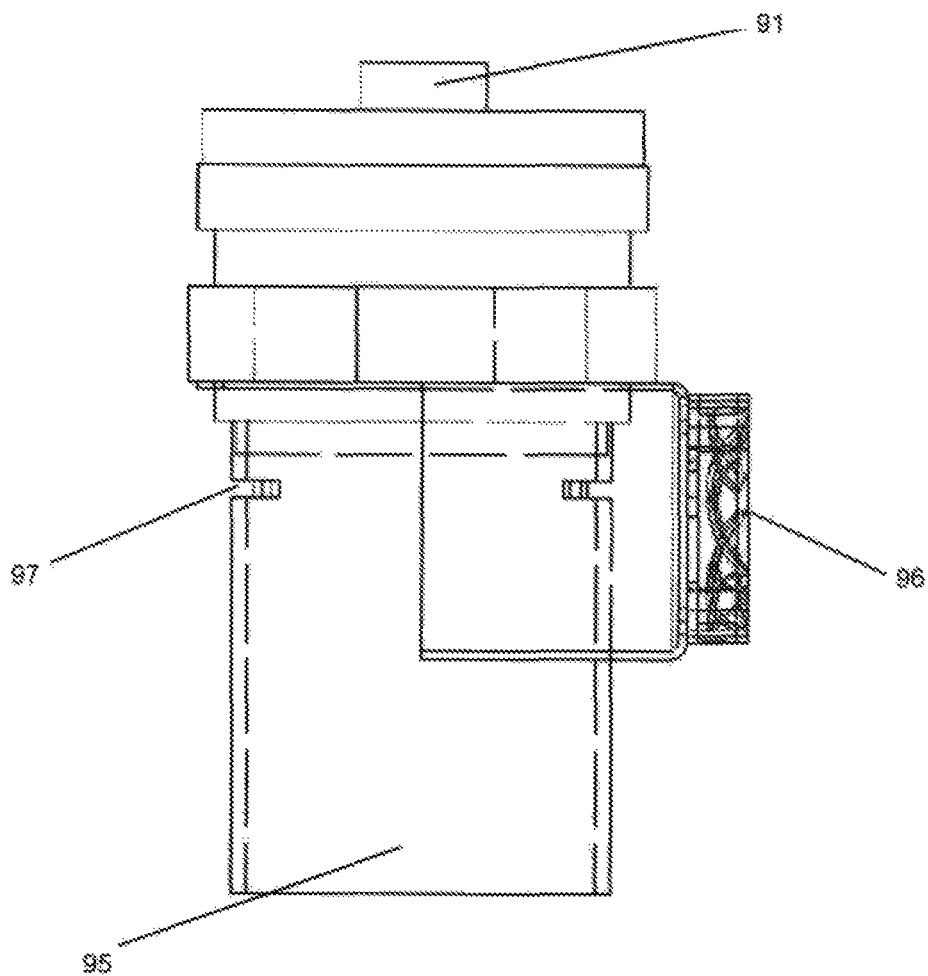
FIG. 23 is a side cross-sectional view of the level sensor component.

Level sensor 91 may be selected from a variety of known liquid level sensors. When level sensor 91 is an ultrasonic sensor, variations of temperature, pressure and humidity may prevent accurate level detection. Installing a vent 97 along with a ventilation fan 96 at or near the attachment point 95 for level sensor 91 which is placed at a location above the level of the liquid measured, as more fully shown in FIGS. 22 and 23, alleviates problems associated with the variation of temperature, pressure and humidity, providing more consistent and accurate level detection than that achieved previously.

Figure 6:
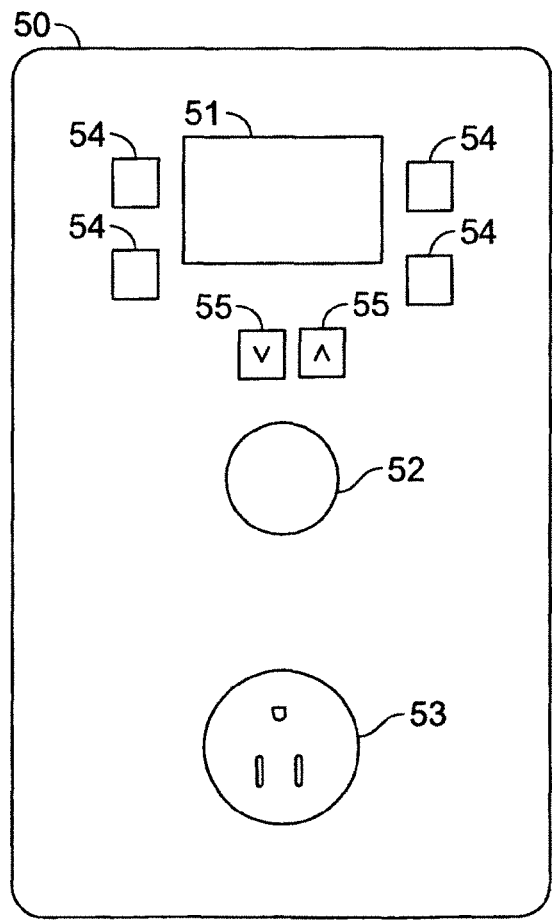
FIG. 6 illustrates a front view of the integrated control panel.

FIG. 6 illustrates the front view of the integrated control panel 50. The fill pump button 52 is typically not mounted on the integrated control panel 50; however, a pressure switch is plugged into the fill pump switch port. The pressure switch is used to indicate that the fill pump must be turned on to pump fresh oil. It can be connected in one of two modes. It can be a dry contact and is connected to the fill pump switch input 53. In this mode, the integrated control panel will turn on the fill pump and log the event. It can also be connected to the fill pump directly, by switching the AC line. In this mode, a relay with an AC coil is required to connect to the fill pump switch input to log the event.

Typically, the integrated control panel 50 is rectangular shaped, however any other suitable shape can be used as is known in the art without affecting the overall concept of the invention. The integrated control panel 50 would generally be constructed of metal, such as aluminum or stainless steel or a specifically engineered plastic, such as a specialized polyethylene terephthalate (PET), though any other suitable material may be used to manufacture the integrated control panel 50 as is known in the art without affecting the overall concept of the invention. The integrated control panel 50 is approximately between 3 and 12 inches in length as measured from top to bottom, approximately between 5 and 10 inches wide as measured from side to side, and approximately between 1 and 5 inches thick, as measured from front to back. However, any suitable size can be used as is known in the art and as warranted by the needs and wants of the user depending on the type and size of container being measured and monitored.

The integrated control panel 50 may further comprise gauges and buttons, dials, switches, or any other suitable devices to measure and monitor usage and collection volumes, filtration status, and any other measurement variable as is known in the art and desirable to the user. These gauges, buttons, dials, switches, etc., can be arranged in any configuration as is known in the art, and can include different measurement controls depending on the container that the integrated control panel 50 is attached to. For example, if the integrated control panel 50 is secured to a waste oil container, the integrated control panel 50 would comprise a level sensor, a filter pump control, a fill shutoff valve, and optionally a waste oil pump-out enable valve. The level sensor would monitor the level of oil in the container. The filter pump control would control the filter pump. Pushing the filter pump button turns on the filter pump for a predetermined or preset amount of time. The fill shutoff valve closes an inlet valve once waste oil in the container reaches a certain level and opens the inlet valve when the waste oil has been removed from the container. And, the optional waste oil pump-out enable valve opens the pump-out valve when the container is full and waste oil needs to be pumped-out, and closes the pump-out valve when the container is empty and ready to be filled.

Furthermore, depending on the variables being measured or monitored, the integrated control panel 50 can comprise alarms and/or user alerts. For example, an alarm can be triggered when the fresh oil supply reaches a certain level so that a user knows to re-fill the tank, or an alarm can be triggered when the waste oil tank reaches a 'full' level so that a user can empty the tank, or an oil collection company can be automatically notified to come and empty the tank. Additionally, user alerts and/or alarms can also be sent if the integrated control panel 50 displays any diagnostic warnings. Furthermore, the alarms and/or user alerts can be any type of warning response as is known in the art, such as flashing lights, an audible sound, etc.

In either a waste oil container or a fresh oil container, the integrated control panel 50 can also comprise a flash memory card (not shown) or any other suitable memory device for storing the data and/or for recording at least a portion of the measurements. This stored and/or recorded data can be used to create data reports or data logs for the user. Additionally, the integrated control panel 50 can be a stand-alone device that monitors and measures, and then displays the measurements taken via a display 51; however, the integrated control panel 50 can also interact with and be linked to a computer program to function as a data management system which connects to the Internet.

Figure 7A:
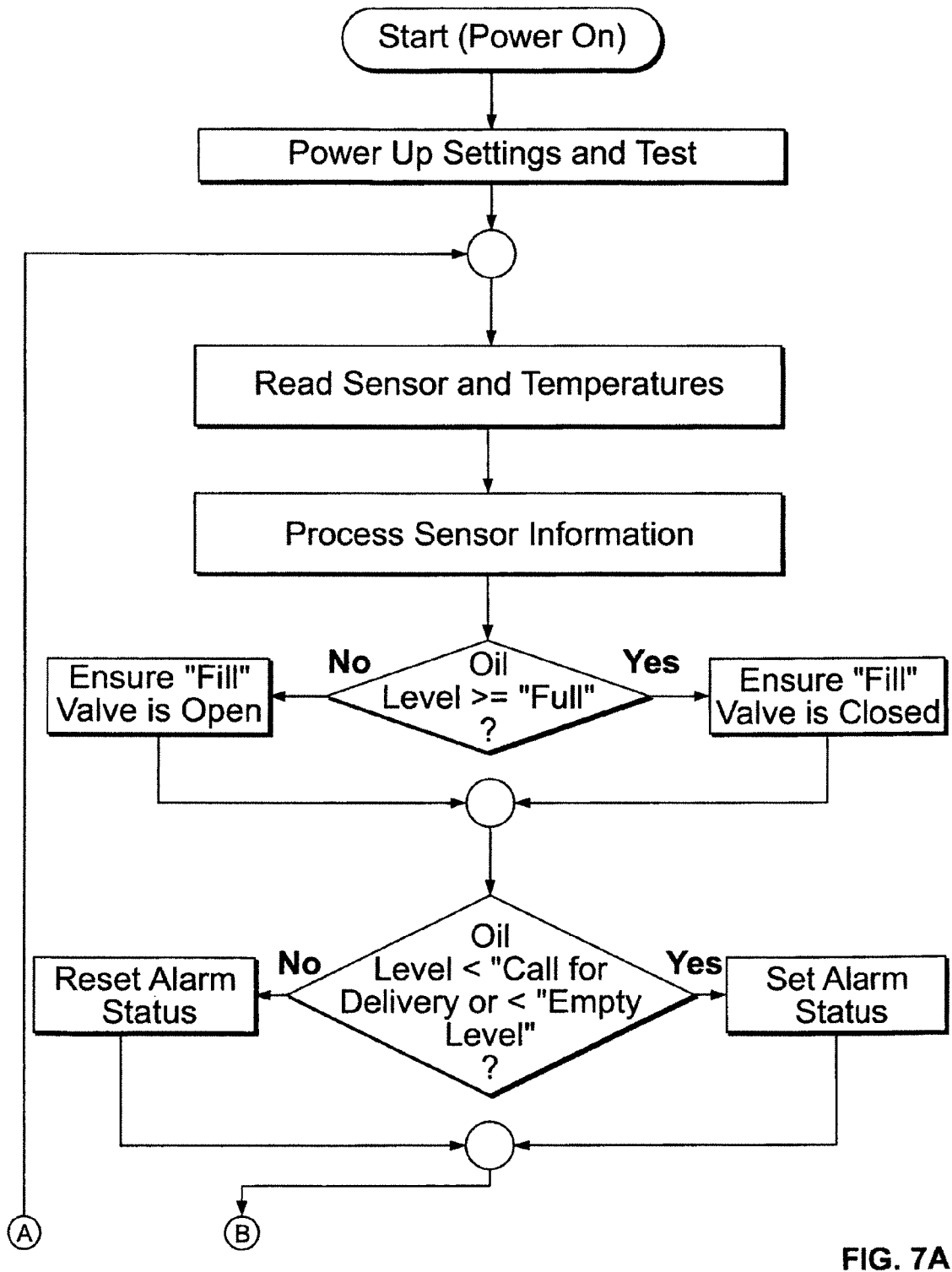
FIG. 7a and FIG. 7b depict a flowchart comprising a schematic representation of the logic of the fresh oil monitoring process.
Figure 7B:
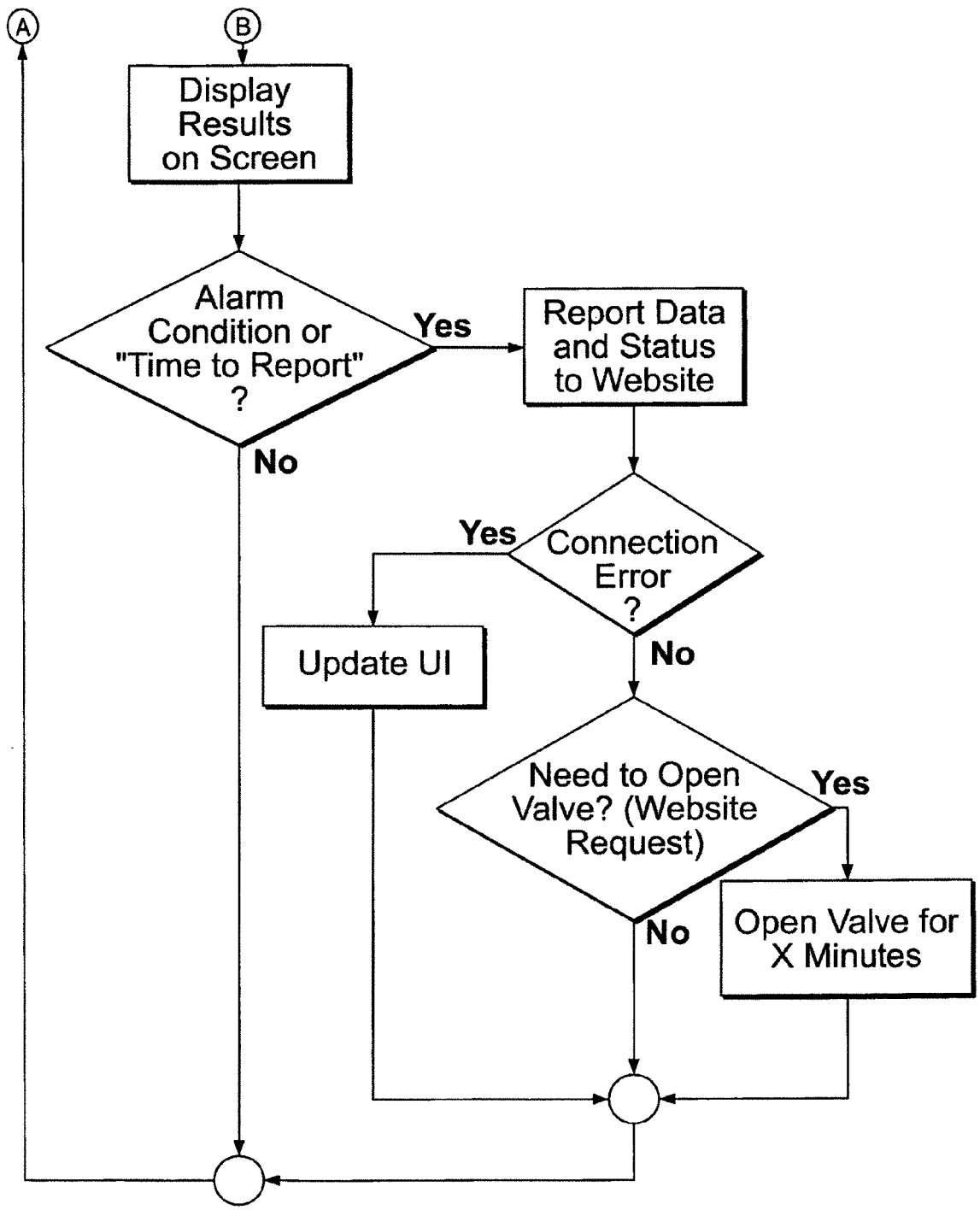

As previously discussed, the integrated control panel 50 is connected to the fresh oil container 60 and as the integrated control panel 50 receives data through the various sensors previously discussed, the integrated control panel 50 processes the data received and controls the connected valves and pumps according to the logic flowchart in FIGS. 7a and 7b.

Figure 8A:
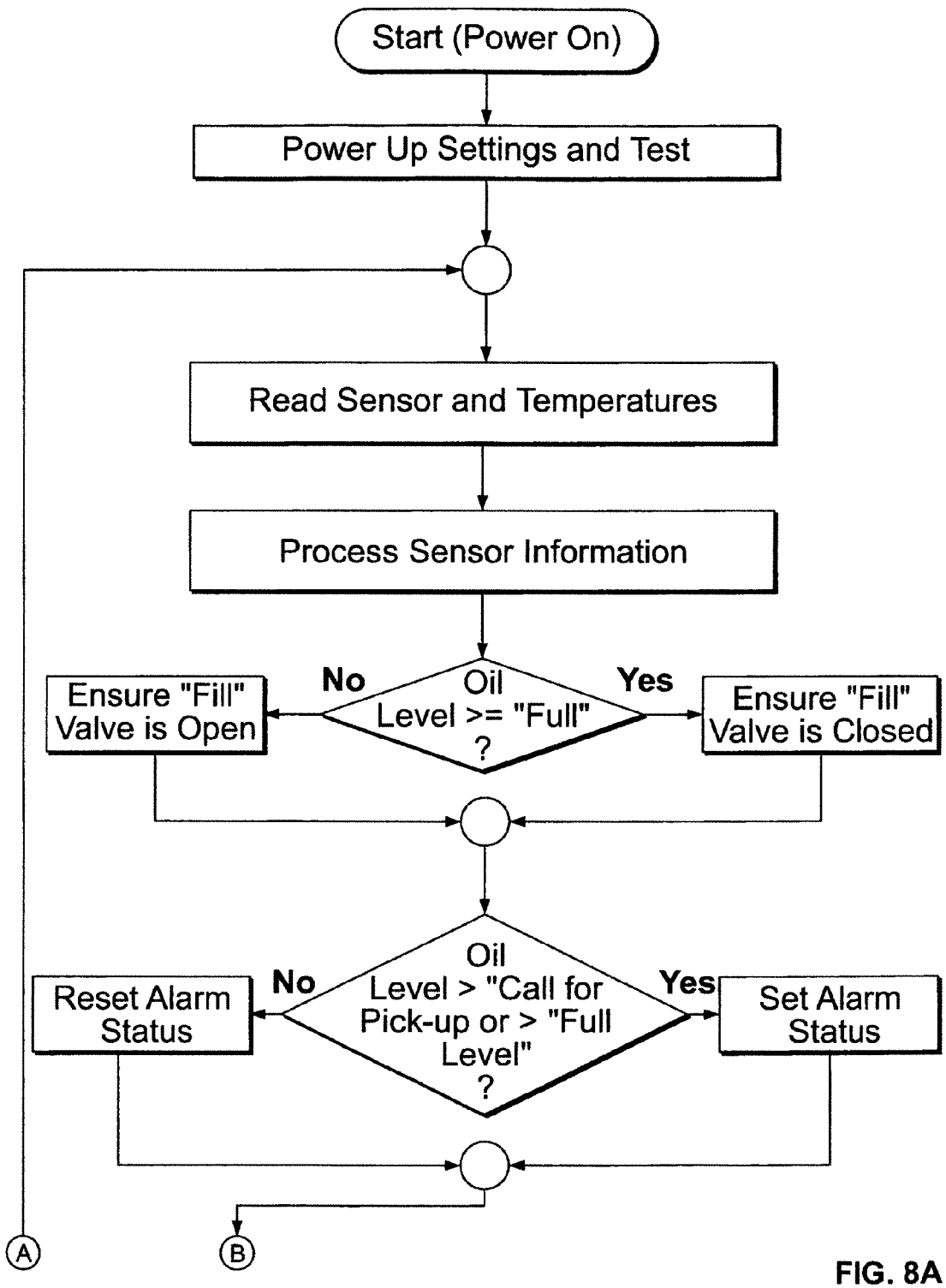
FIG. 8a and FIG. 8b depict a flowchart comprising a schematic representation of the logic of the recovery and filtration oil monitoring process.
Figure 8B:
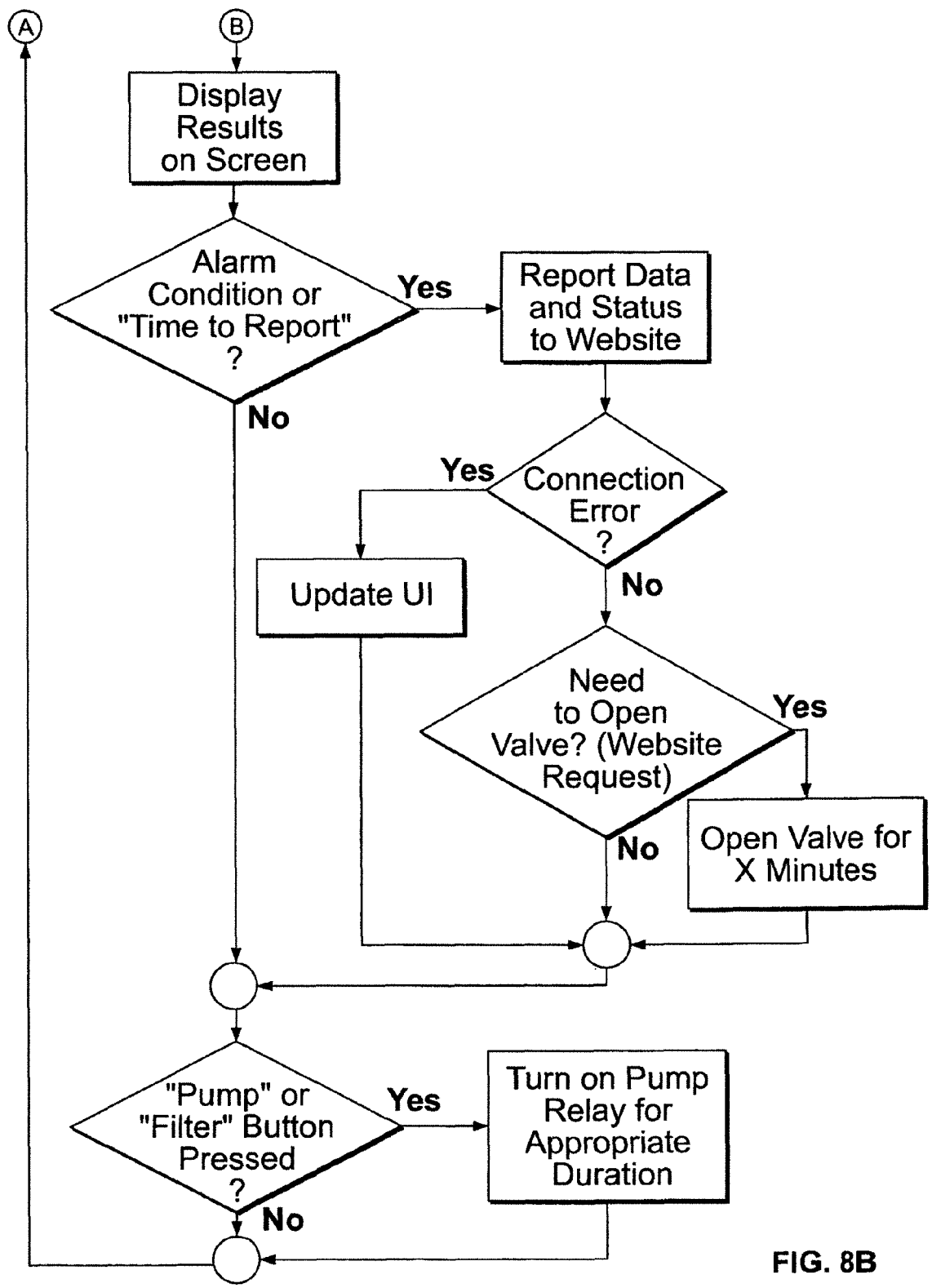
Figure 9:
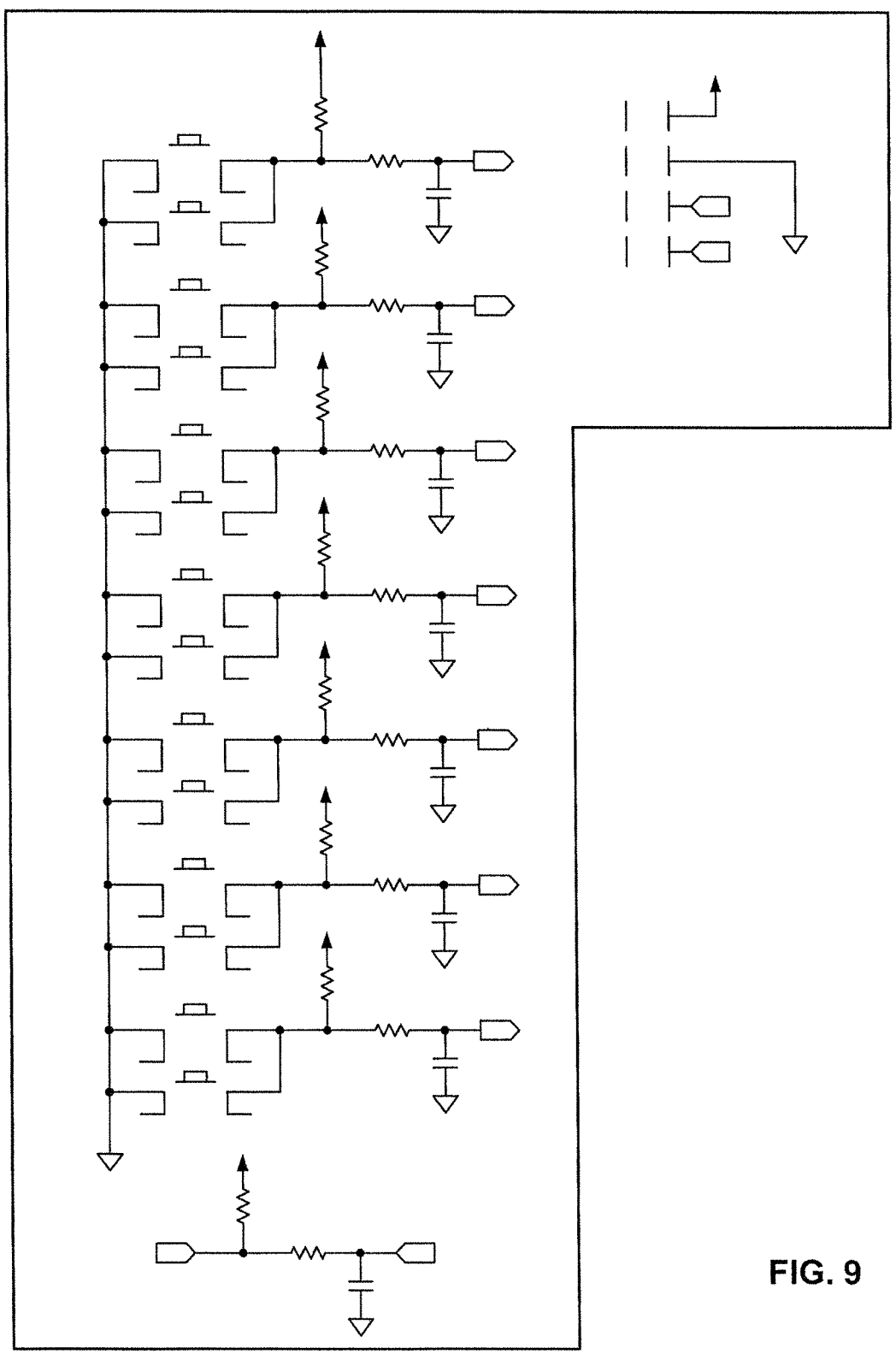
Figure 10:
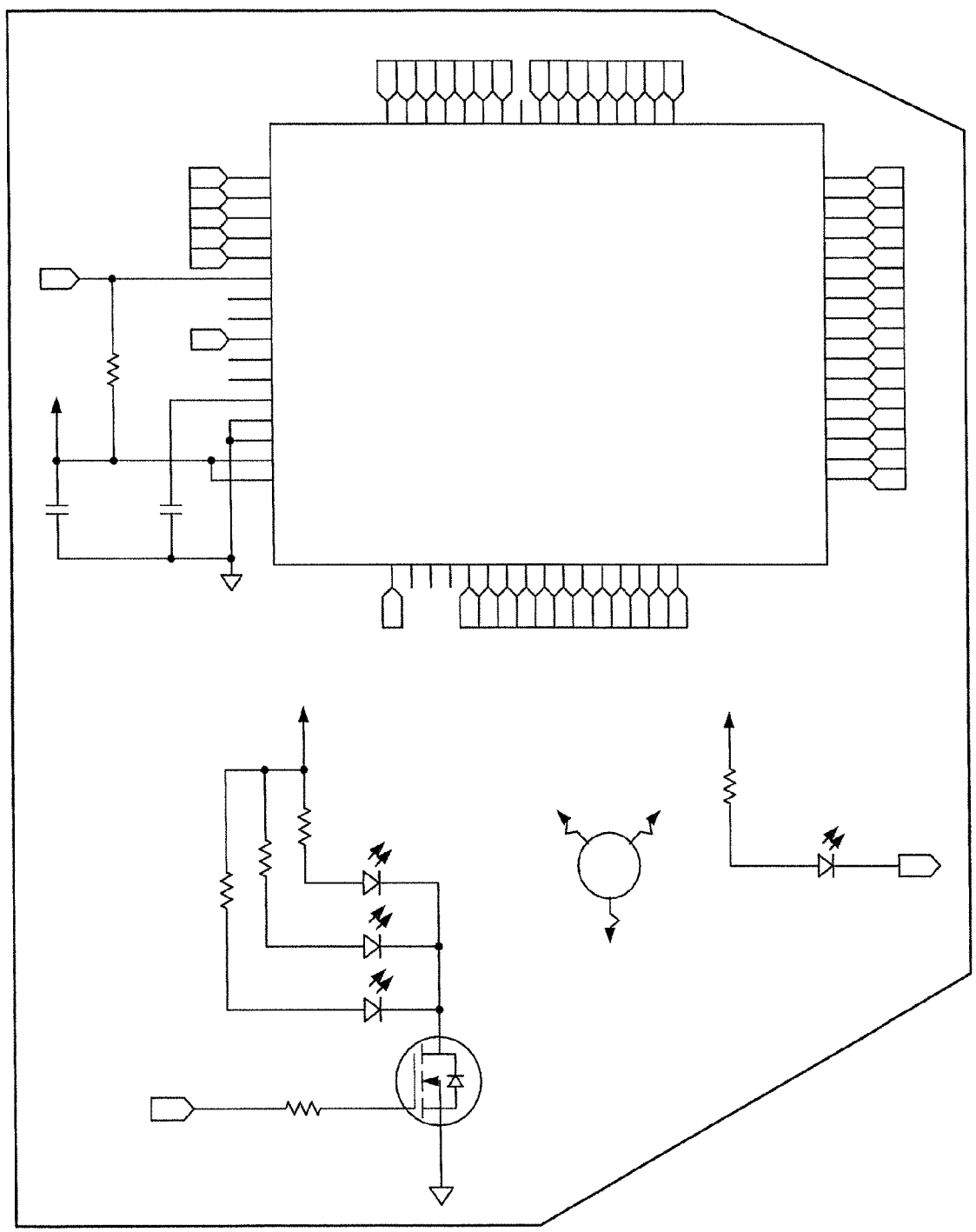
Figure 11:
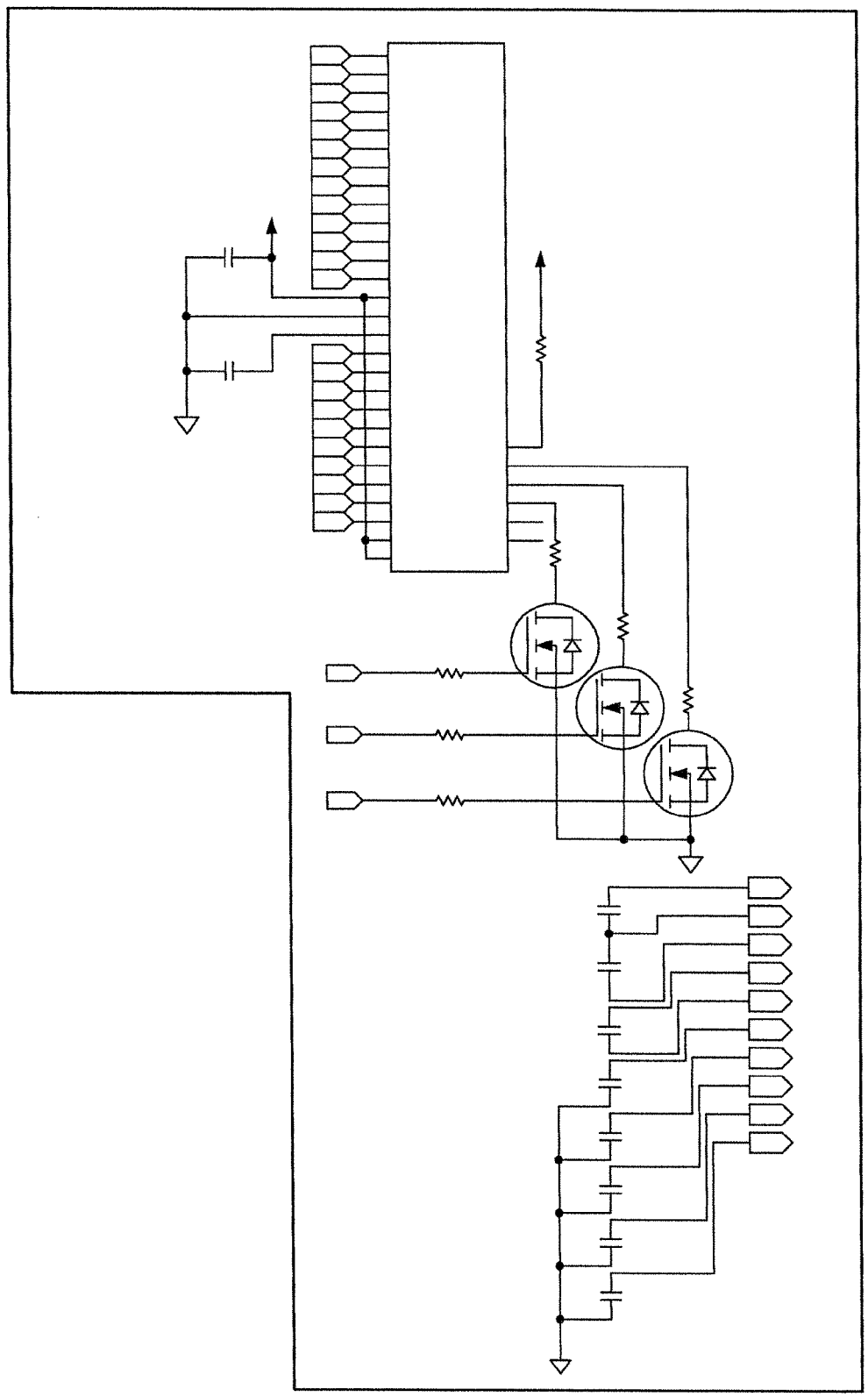
Figure 12:
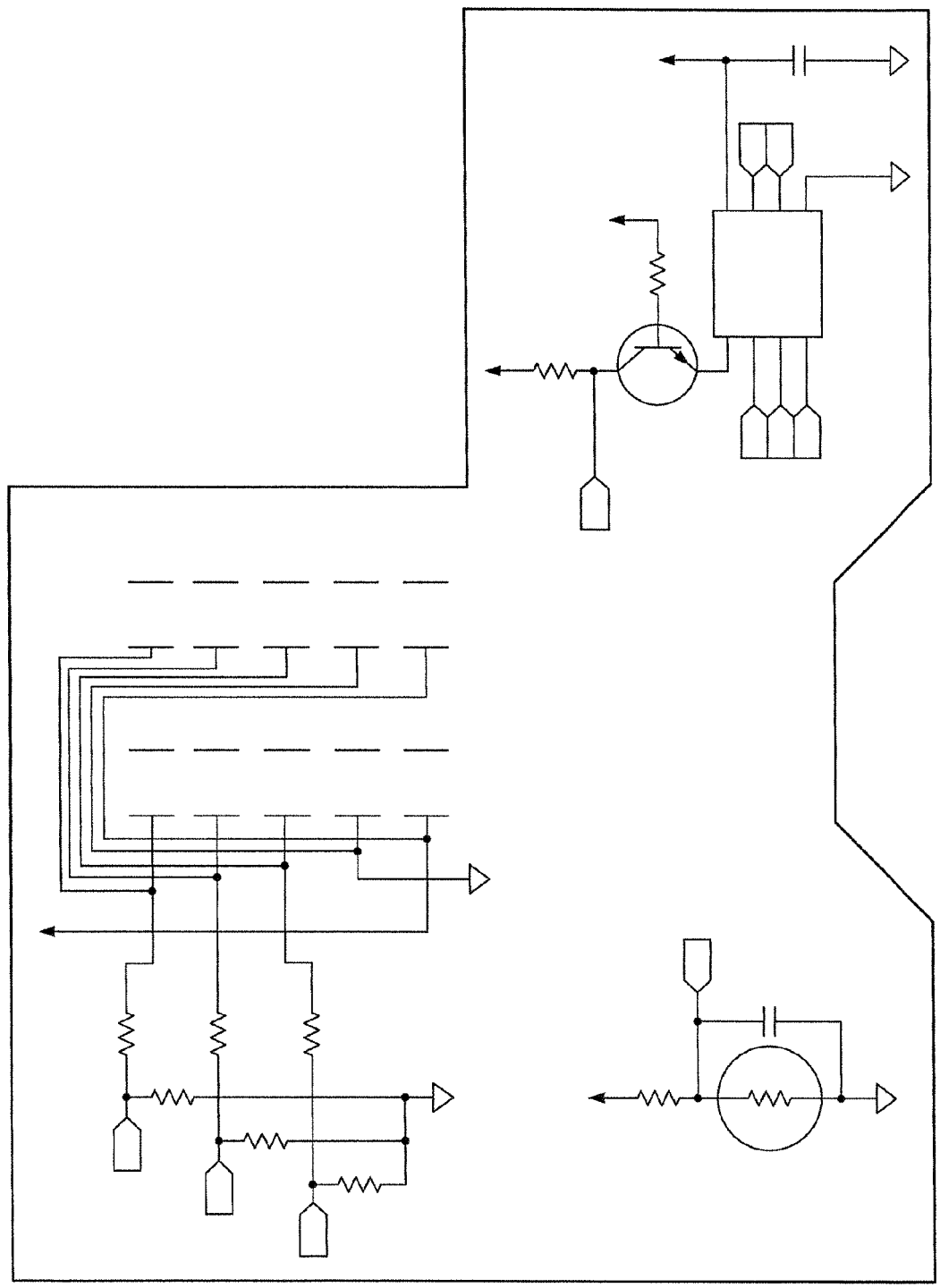
Figure 13:
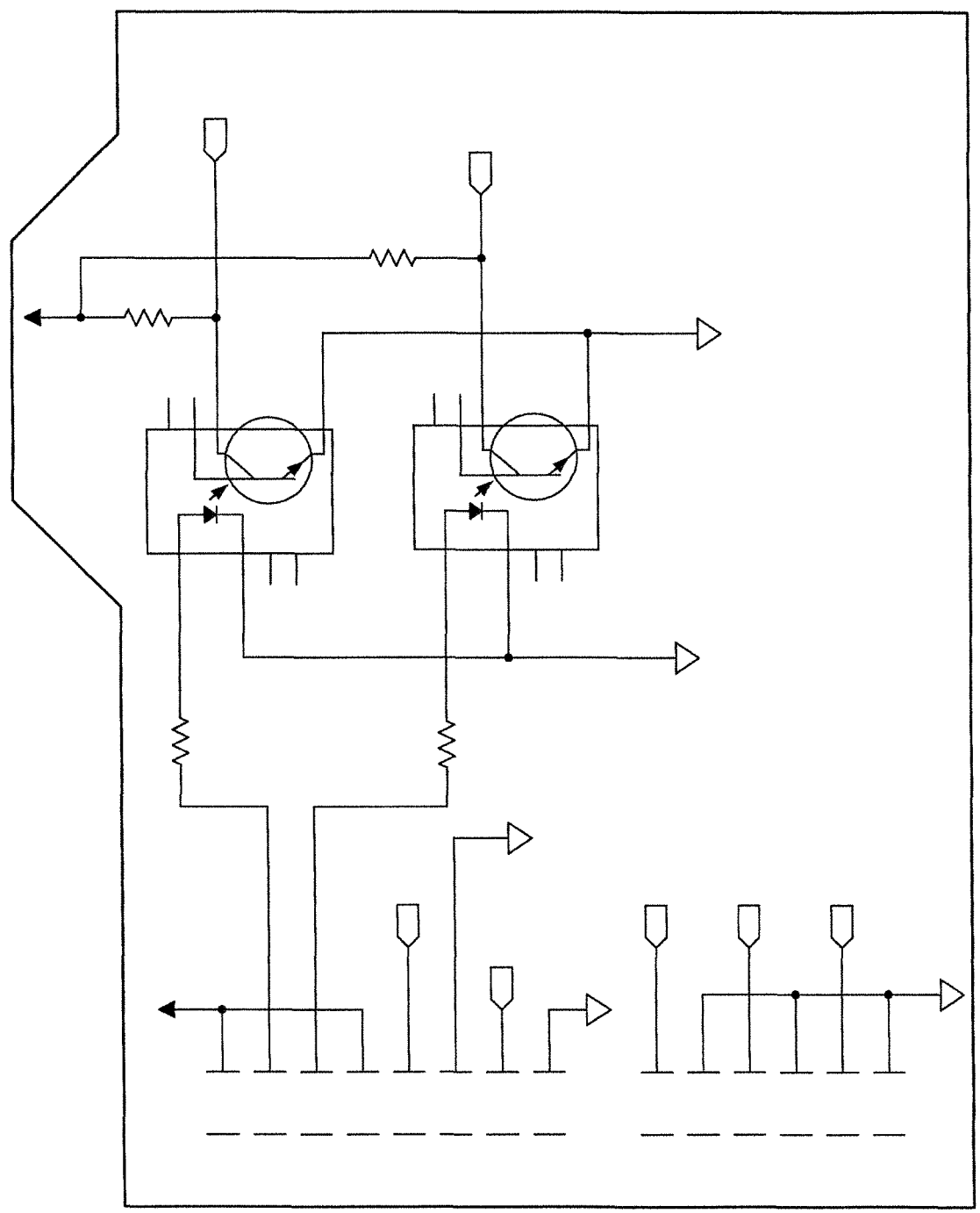
Figure 14:
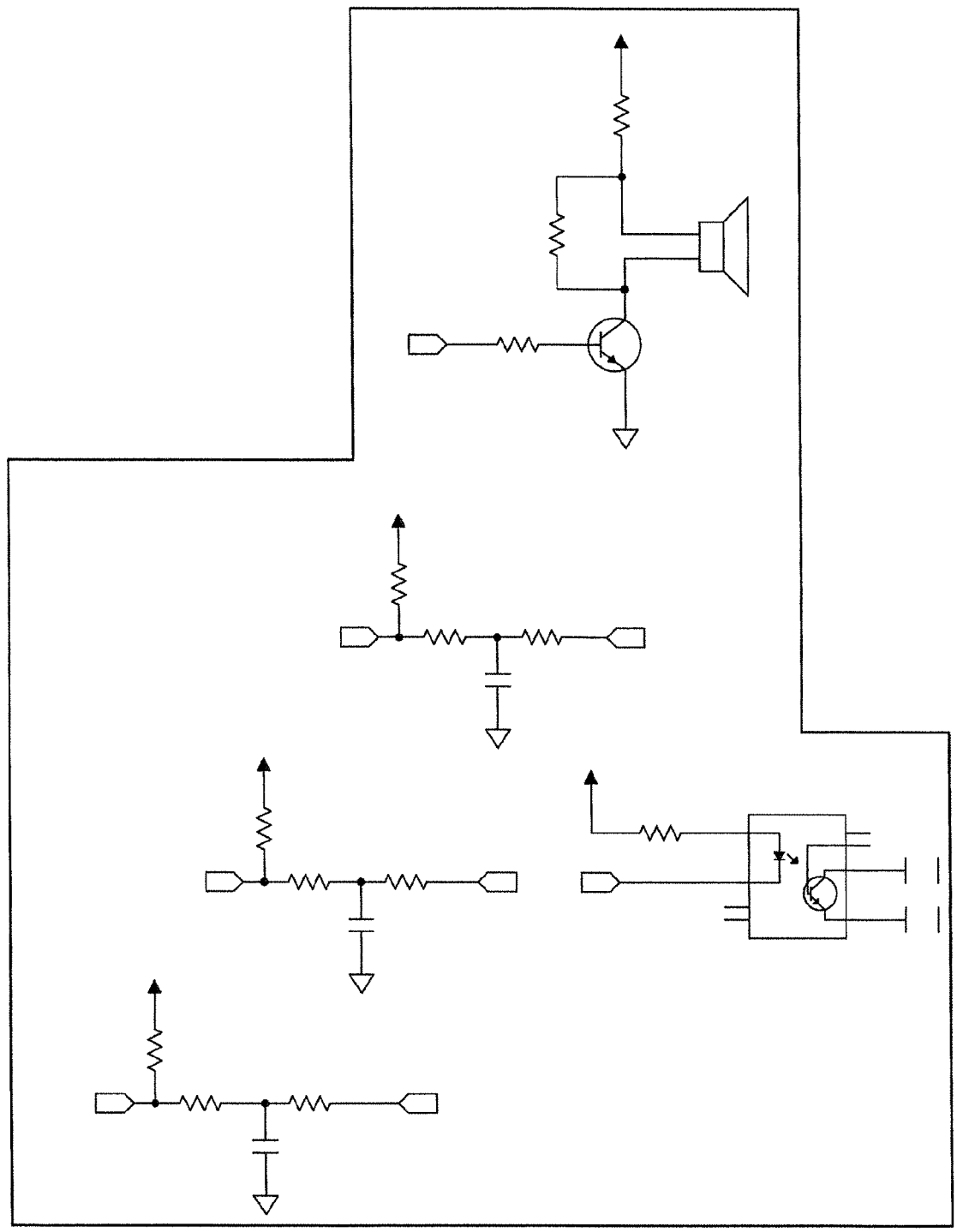
Figure 15:
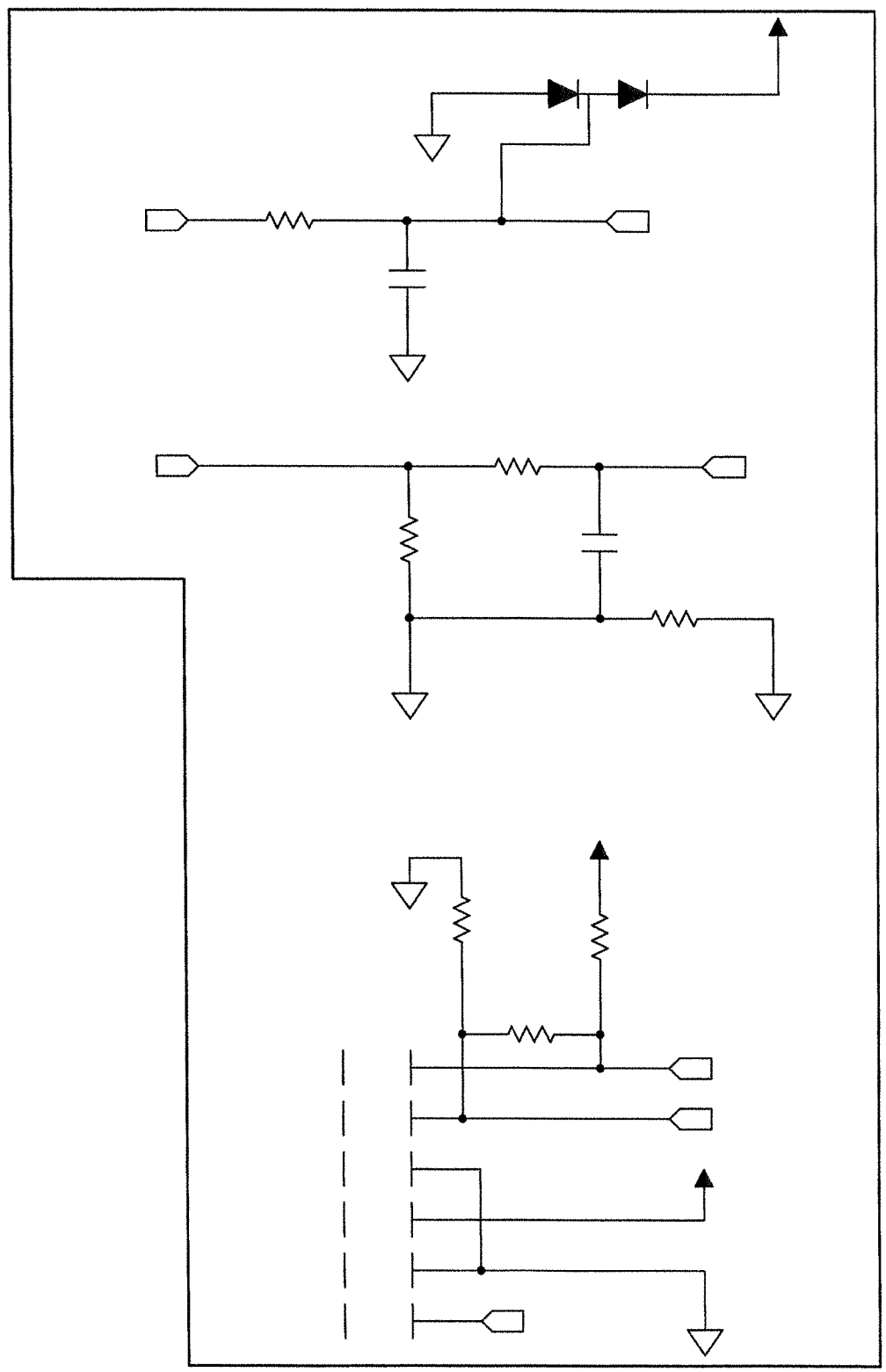
Figure 16:
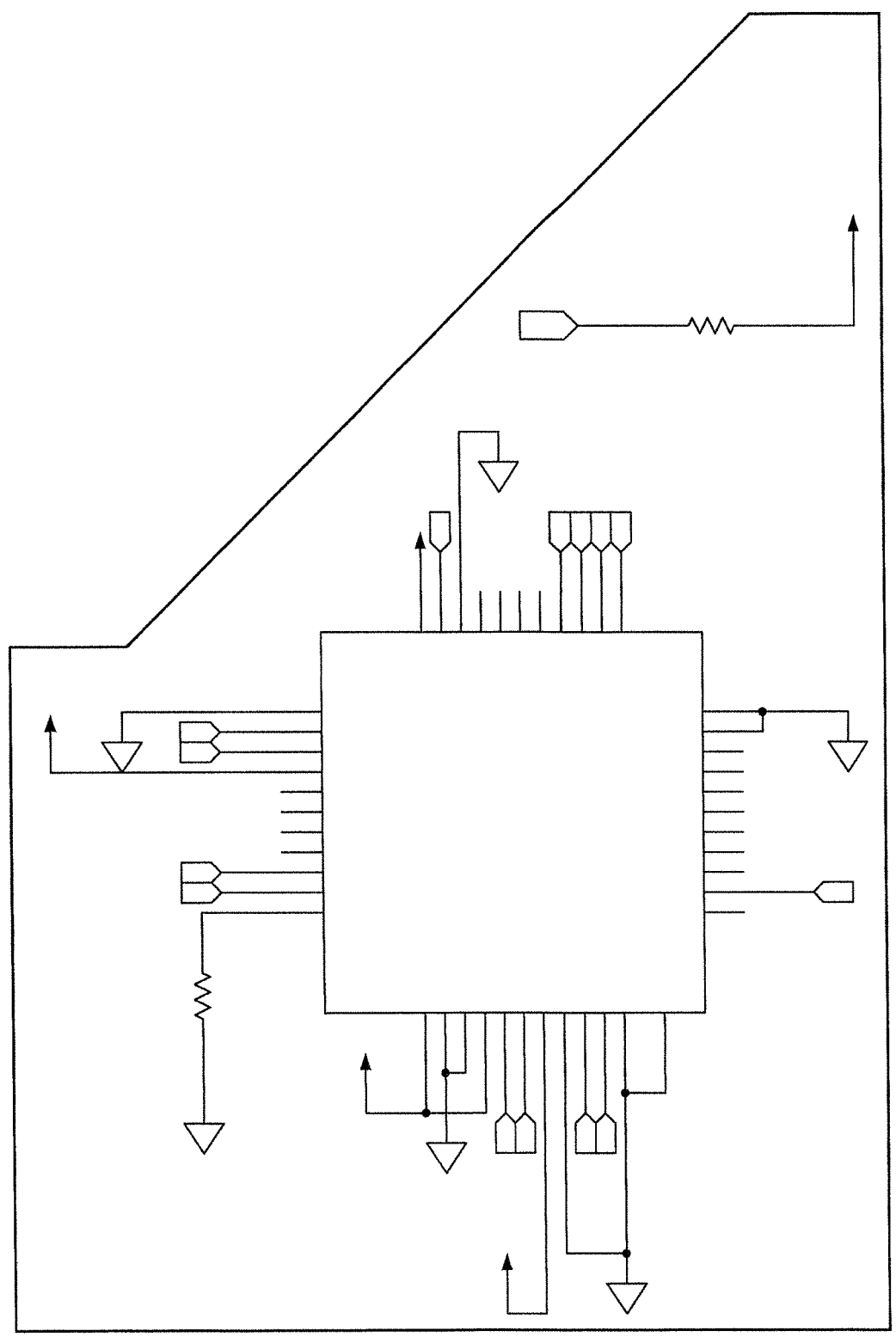
Figure 17:
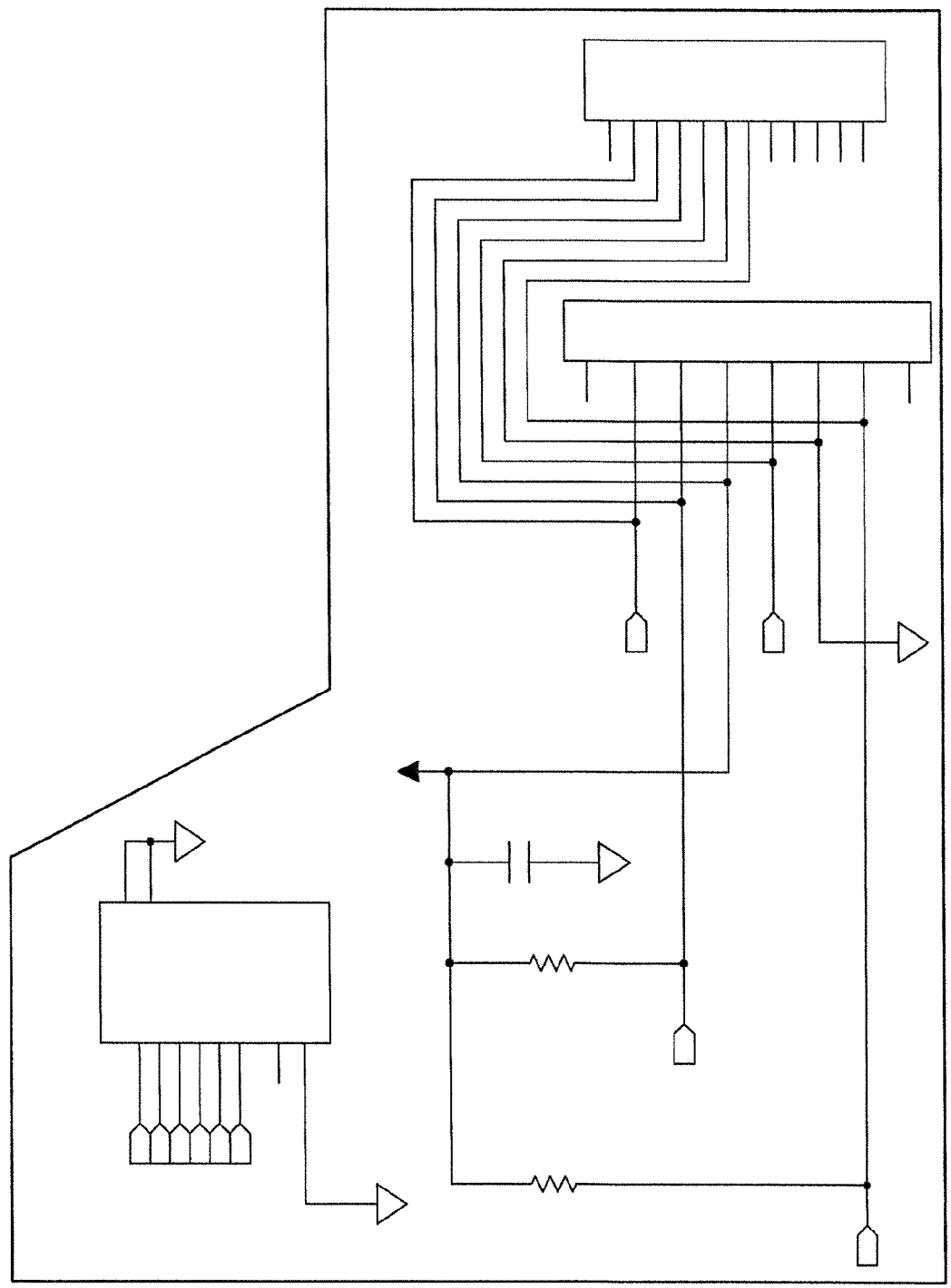
Figure 18:
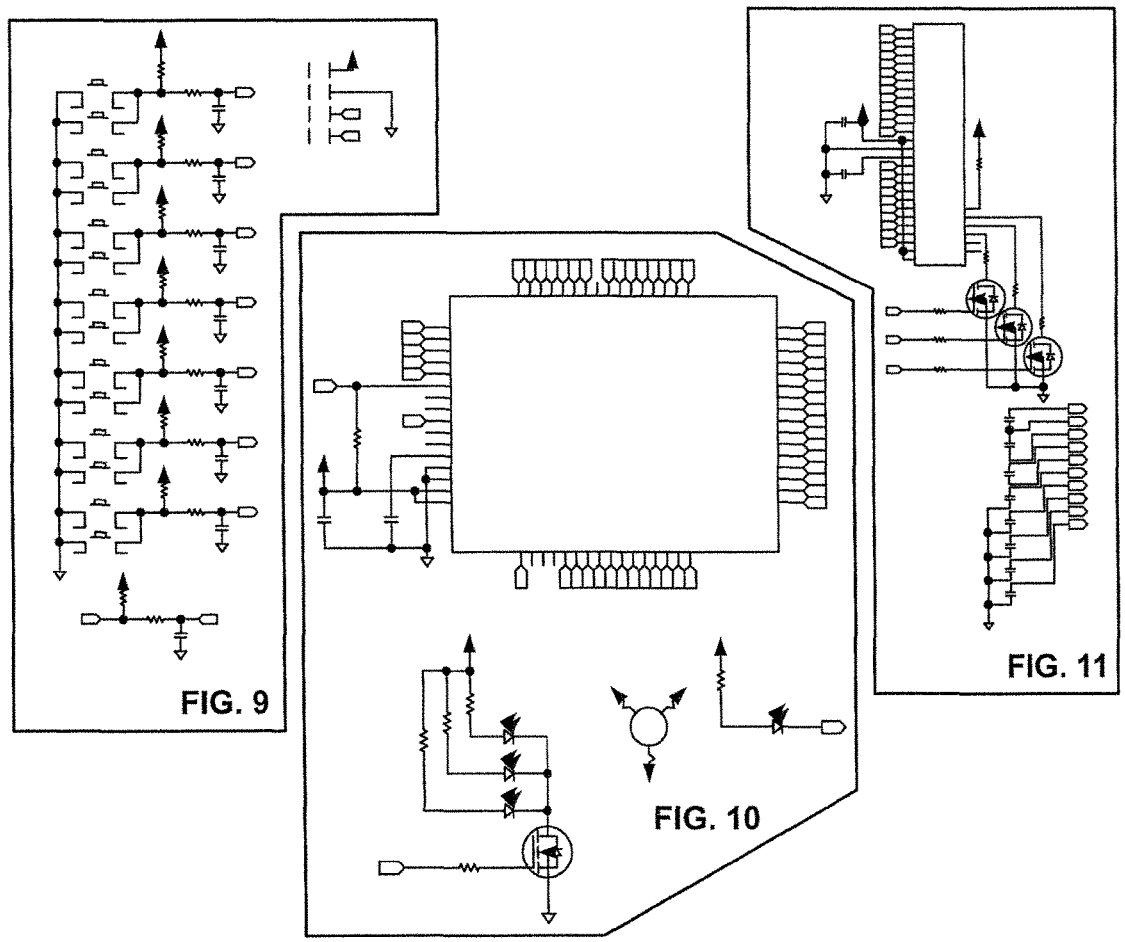
Figure 19:
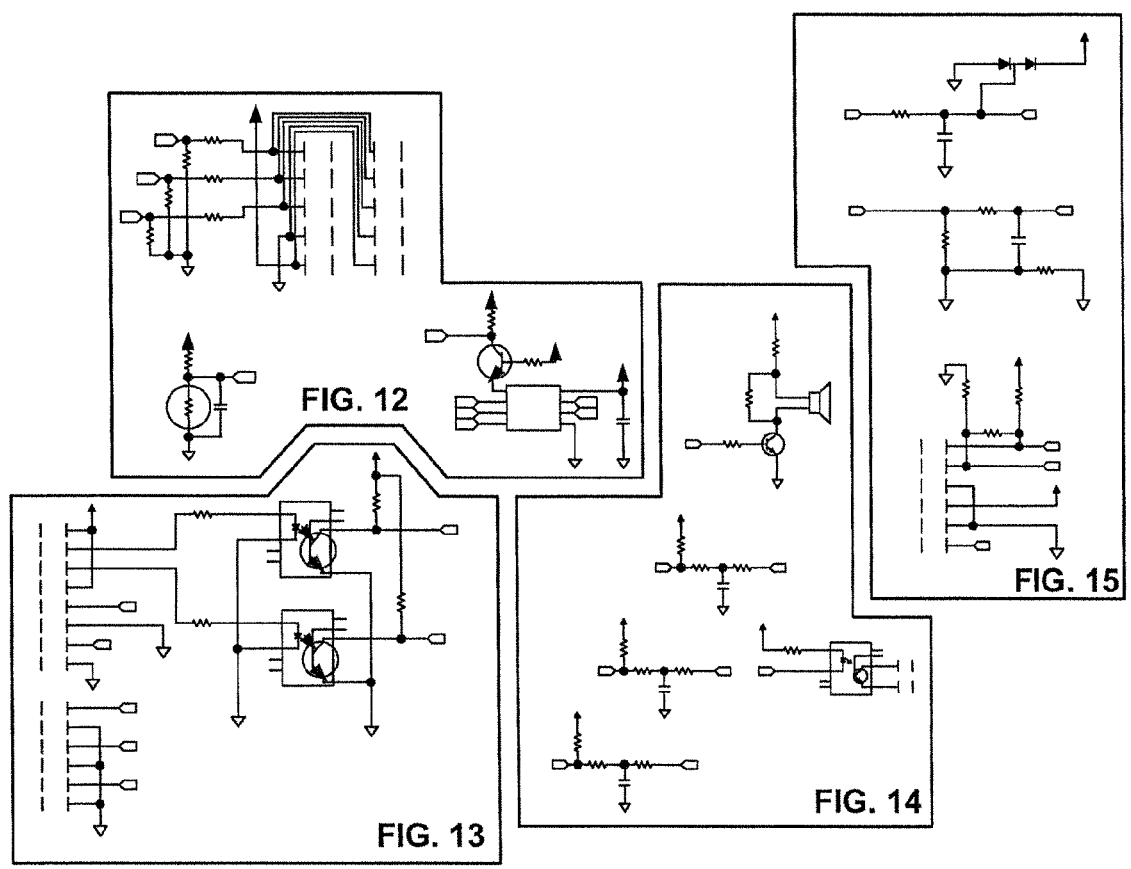

Similarly, the integrated control panel 50 is connected to the waste oil container 90 and filtration loop 80 and as the integrated control panel 50 receives data through the various sensors previously discussed. The integrated control panel 50 processes the data received and controls the connected valves and pumps according to the logic flowchart in FIGS. 8a and 8b.

The schematics in FIGS. 9-20 show in greater detail the circuitry for the integrated control panel.

Figure 21:
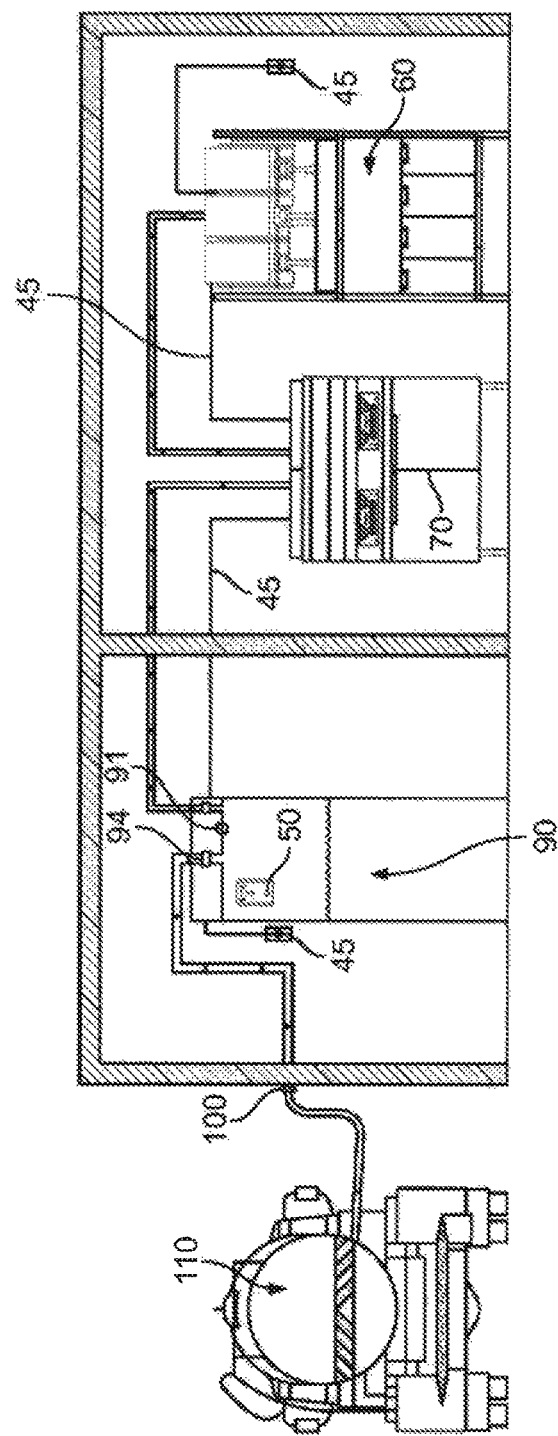
FIG. 21 illustrates a diagram of the entire oil system.

FIG. 21 illustrates a diagram of an entire oil system. The embodiment of the oil system depicted includes a fresh oil container 60, a fryer 70, and a waste oil container 90, all of which are in communication with an integrated control panel 50. The fresh oil container 60, fryer 70, waste oil container 90, and truck 110 are shown as connected via plumbing (not numbered) to handle the flow of oil. The integrated control panel 50 operates in communication with every piece of the system, and the various valves, pumps and sensors associated with each piece, including the waste oil pumpout enable valve 94 or the level sensor 91, through a data communication connection 46. The sensor or ancillary computer (not shown) and the integrated control panel 50 accumulates data from each allowing management of the oil usage in the system. The integrated control panel 50 is also connected via a communication path 45, which is any suitable means known in the art (meaning hard-wired or wireless connection or cellular network), to an end user who can access and monitor the data collected by the integrated control panel 50.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. For example, it is also contemplated that the system can be used to monitor not just cooking oil, but any type of oil as is known in the art, such as motor oil, hydraulic oil, etc. It is further contemplated that the system can be used to monitor any fluid in general, as is known in the art. The embodiments were chosen and described in order to best explain principles of the invention and its practical application, to thereby enable others skilled in the art to best utilize the invention and its various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An oil recovery system comprising: a waste oil receptacle;
    an oil monitoring and control device in communication with the waste oil receptacle;
    a user interface in communication with the oil monitoring and control device;
    a fluid level measuring means in the waste oil receptacle, wherein, the fluid level measuring means comprises a sensor, a fan, and a vent,
    wherein said fan and vent are provided to control variations of temperature, pressure, and humidity in order to more accurately sense the level of waste oil in the receptacle, said fluid level measuring means is in communication with the oil monitoring device;
    an alarm means set to a predetermined fluid level of the waste oil in the receptacle for transmitting an alert to the user interface in response to a detection of that predetermined level;
    a remotely controlled valve for opening and closing the waste oil receptacle, which opening or closing occurs in response to a signal from the oil monitoring and control device; and
    a valve position detection means for detecting the position of the remotely controlled valve utilized in opening and closing the waste oil receptacle and for transmitting a signal reflective of that position to the user interface.

2. An oil recovery system of claim 1, further comprising a password protected security means for preventing unsecured access to the remotely controlled valve utilized in opening and closing the waste oil receptacle.

3. An oil recovery system of claim 2, further comprising a valve position detection means for detecting the position of a valve utilized in opening and closing the filtration loop of the system.

4. A method automating and monitoring the removal of waste oil from a facility using the apparatus of claim 1, the method comprising the steps of:
    monitoring the quality of oil being used;
    transmitting a first signal to a data transfer and analysis system reflective of the monitored quality;
    receiving the data from the first signal and comparing that data with a predetermined standard reflective of the monitored quality;
    transferring the oil to a waste oil receptacle when the predetermined standard reflective of the monitored quality is satisfied;
    monitoring the volume of oil in the waste oil receptacle;
    transmitting a second signal to a data transfer and analysis system reflective of that volume;
    receiving the data from the second signal and comparing that data with a predetermined standard reflective of that volume;
    transmitting an alert to a user when the data from the second signal is reflective of a volume that exceeds the predetermined standard;
    monitoring the position of a remotely controlled valve utilized to in opening and closing the waste oil receptacle;
    opening the remotely controlled valve;
    transferring the oil from the waste oil receptacle to a removal vehicle; and
    transmitting a third signal to a data transfer and analysis system reflective of the volume of waste oil transferred.

5. The method of claim 4 wherein a fan and vent combination is used to ensure accurate measurements of the volume of oil in the waste oil receptacle.

6. The method of claim 4 further comprising password protecting the remotely controlled valve whereby the valve may only be opened in response to a user-input password that matched a pre-set password in the data transfer and analysis system.

7. The method of claim 4 further comprising a filtering process that comprises the additional steps:
    transmitting an alert to a user when the data from the first signal reflective of the monitored quality is reflective of an oil quality that falls below a predetermined level; and
    filtering the oil in response to a user input while concurrently sending a signal to a data transfer and analysis system reflecting such filtering.

* * * * *